United States Patent [19] [11] Patent Number: 4,826,111
Ismert [45] Date of Patent: May 2, 1989

[54] GROUND ANCHOR DEVICE

[76] Inventor: Daniel A. Ismert, 6 E. 127th St., Kansas City, Mo. 64145

[21] Appl. No.: 89,321

[22] Filed: Aug. 25, 1987

[51] Int. Cl.$^4$ ............................................... F16L 3/00
[52] U.S. Cl. ...................................... 248/49; 405/172; 405/154
[58] Field of Search ...................... 405/154, 158, 172; 248/49, 55, 62, 65, 70; 24/162, 514

[56] References Cited

U.S. PATENT DOCUMENTS

| | | | |
|---|---|---|---|
| 2,474,920 | 7/1949 | Stearns | 248/49 |
| 3,183,572 | 5/1965 | Fritz | 25/126 |
| 3,330,121 | 7/1967 | Tait | 248/49 X |
| 3,568,455 | 3/1971 | McLaughlin et al. | 405/154 |
| 4,090,686 | 5/1978 | Yarbrough | 248/49 |
| 4,126,012 | 11/1978 | Waller | 405/157 |
| 4,492,493 | 1/1985 | Webb | 405/172 |

Primary Examiner—Dennis L. Taylor
Attorney, Agent, or Firm—Wm. Bruce Day

[57] ABSTRACT

An anchor device for securing a circular pipe to the ground includes a body of flat sheet stock material, opposite ends and a bottom edge. A ground engaging rod or spike is connected to one end of the body for securing it and a pipe retained thereby to the ground. The bottom edge of the body is concave in shape with at least first and second substantially straight edge segments joined to a middle edge segment. The angular relationship of the segments permit the anchor device to fit portions of the circumferences of commonly used sizes of pipe.

2 Claims, 1 Drawing Sheet

U.S. Patent
May 2, 1989
4,826,111
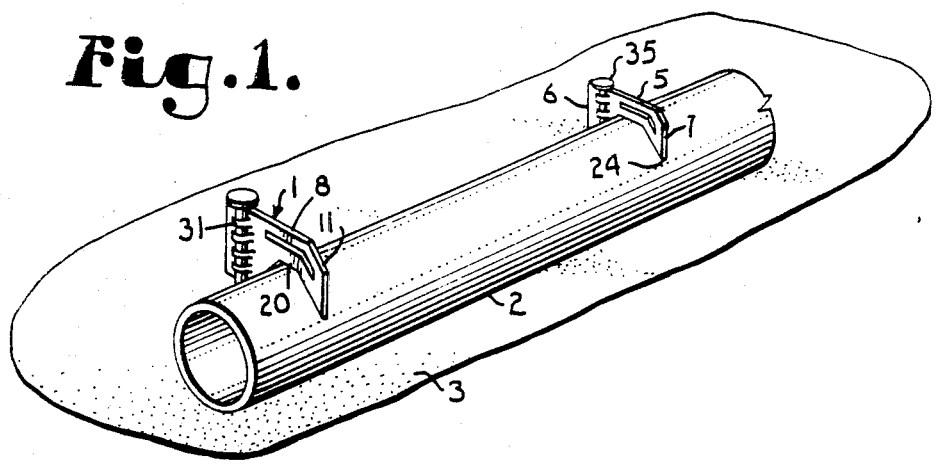
Fig. 1.
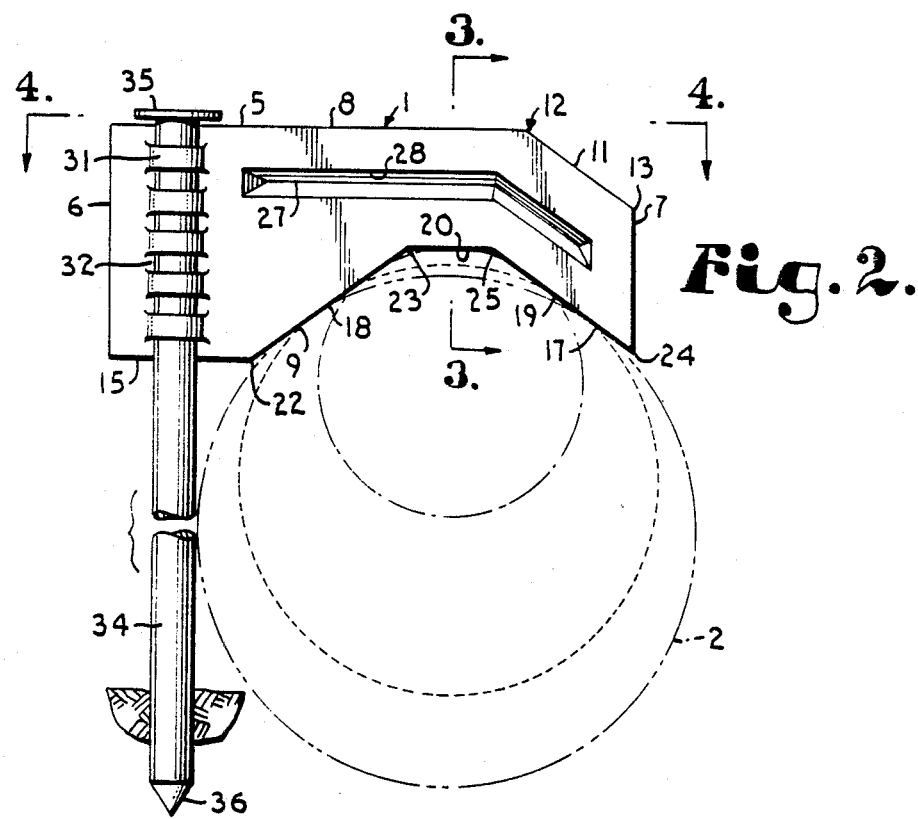
Fig. 2.
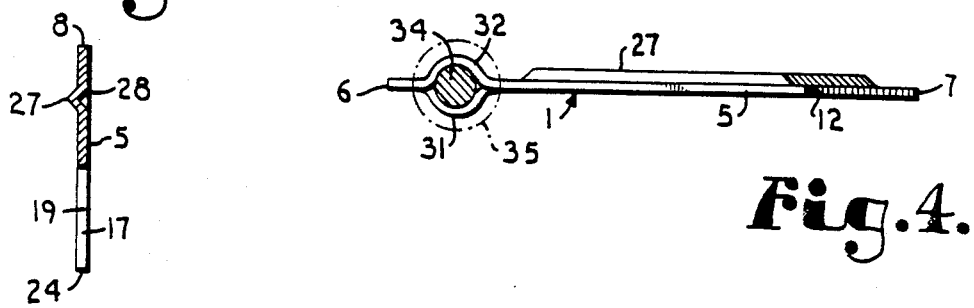
Fig. 3.
Fig. 4.

_4,826,111_

GROUND ANCHOR DEVICE

FIELD OF THE INVENTION

The present invention relates to pipe anchors, and particularly, to pipe anchors which may be readily used during foundation construction work to secure pipe prior to pouring concrete.

BACKGROUND OF THE INVENTION

Plastic pipes and particularly plastic drain pipes used by plumbers today are lightweight, durable, relatively inexpensive and not subject to corrosion. Accordingly, plastic pipes have become the material of choice for most new construction. However, a drawback is noted with such plastic piping in that in contrast to cast iron pipes, the plastic pipe is so lightweight that it tends to float upwardly when pouring concrete foundation slabs about the pipe. In such construction, piping is laid down upon a surface of crushed rock and the concrete poured thereover, tending to dislodge and displace the lightweight plastic piping and causing it to float upwardly toward the surface of the basement floor or pad. These unsatisfactory results have commonly been remedied by bending a length of reinforcing rod in to a U-shape, and inverting it to form a wicket which fits down over the pipe and is intended to hold it in place. These on the job remedies are overly time consuming to construct and the present invention is designed to provide a relatively inexpensive and simple way to anchor piping, particularly plastic piping, preparatory to pouring concrete thereover. Additionally, since the plastic pipe may be of varying diameters according to the particular use and area of drainage of the pipe, the instant invention is intended to accommodate pipes of varying diameters.

SUMMARY OF THE INVENTION

The present invention provides an improved anchor device for securing a cylindrical pipe to the ground and includes a body of flat sheet stock material with a ground engaging rod connected to one end of the body. The body has a bottom edge consisting of a plurality of relatively straight edge segments which provide a concave recess for fitting over and retaining the pipe, and particularly pipe of varying diameters. Because the body is preferably of thin flat sheet stock material, a rib is provided in the body to prevent "oil canning", or flexing of the material.

OBJECTS OF THE INVENTION

The principal objects of the present invention are: to provide an improved pipe retaining anchor device; to provide such an anchor device which is easily constructed of a body of flat sheet stock material; to provide such an anchor device which includes means for retaining pipes of varying outside diameter; to provide such an anchor device which is easily manufactured and shipped; and to provide such a device which is economical to manufacture, efficient and durable in operation, and which is particularly well adapted for its intended purpose.

Other objects and advantages of this invention will become apparent from the following description taken in conjunction with the accompanying drawings wherein are set forth, by way of illustration and example, certain embodiments of this invention.

BRIEF DESCRIPTION OF THE DRAWINGS

FIG. 1 is a perspective view of a pipe being retained by the anchor devices of the present invention preparatory to concrete pouring operations.

FIG. 2 is an enlarged elevational view of the anchor device.

FIG. 3 is a top edge of the anchor device.

DETAILED DESCRIPTION OF THE PREFERRED EMBODIMENT

As required, a detailed embodiment of the present invention is disclosed herein, however, it is to be understood that the disclosed embodiment is merely exemplary of the invention which may be embodied in various forms. Therefore, specific structural and functional details disclosed herein are not to be interpreted as limiting, but merely as a basis for the claims and as a representative basis for teaching one skilled in the art to various employ the present invention in virtually any appropriately detailed structure.

Referring to the drawings in more detail:

The reference numeral 1, generally designates an anchor device according to the present invention. The anchor device 1 is used for securing a cylindrical pipe 2 to the ground 3 preparatory to concrete pouring operations, as in the construction of a building foundation or pad. For the purposes of definition the term "ground" as used herein is not limited to that of soil or earth, but refers to any ground like or support structure on which the pipe 2 rests or is positioned thereover.

The anchor device 1 generally includes a body 5 of flat sheet stock material having opposite first and second ends 6 and 7 and top and bottom edges 8 and 9. The bottom edge 9 includes means for grasping and retaining a pipe.

In the illustrated example, the body 5 is generally formed from a rectangular piece of sheet stock material with the end edges 6 and 7 parallel to each other and the top edge 8 substantially perpendicular to the end edges 6 and 7 and providing an angled corner edge 11 adjacent its juncture with the end edge 7. The angled corner edge 11 joins the top edge edge 8 at a corner 12 and the end edge 7 at a corner 13, both corners 12 and 13 having, in the illustrated example, an included angle of two hundred and fourteen degrees.

The bottom edge 9 includes a connection end edge 15 positioned adjacent and perpendicular to the end edge 6 and in the illustrated example, the remainder of the bottom edge 9 forms a recess for grasping and retaining the pipe 2. As shown in FIG. 2, the pipe 2 may be of varying outside diameters, ranging from two to four inches, all of which are commonly used sizes for plastic piping. A recessed area 17 includes first and second substantially straight edge segments 18 and 19 extending to and joining a middle edge segment 20, thereby providing a concave recess. The segment 18 adjoins the connection end edge 15 at a corner 22 having an included angle of approximately one hundred and forty-one degrees, and joins the middle edge segment 20 at a corner 23 having an included angle of two hundred and four teen degrees. The second edge segment 19 adjoins the end edge 7 at a corner 24 having an included angle of approximately fifty-five degrees and joins the middle edge segment 20 at a corner 25 having an included angle of approximately two hundred and fourteen degrees.

As shown in FIG. 2, when a two inch pipe is used, the pipe circumference engages the middle edge segment 20 and the first and second edge segments 18 and 19. When a three inch pipe is used, the middle edge segment 20 is not engaged, but the pipe circumference contacts the first and second edge segments 18 and 19 approximately half way between the respective corners 22 and 23 and 24 and 25. When a four inch pipe is used, the middle edge segment 20 is similarly not contacted and the pipe circumference engages the first and second edge segments 18 and 19 relatively adjacent the corners 22 and 24.

Because the body 5 is of relatively thin sheet stock material, it has a tendency to "oil can" or flex upon the application of side loads. For reinforcement, a rib 27 is emplaced therein, as by stamping, and includes a first rib segment 28 extending parallel to the top edge 8 and a second rib segment 29 connecting to the rib segment 28 and extending parallel to the angles corner edge 11. The rib 27 is preferably a V in cross segment.

Adjacent the end edge 6 is a means for connection of a retaining rod to the body 5. In the illustrated example, an eye means 31 is formed by cutting and stamping plurality of flat metal strips 32 arranged to provide a through passage through which an elongate spike 34 is extended. The spike 34 includes a large head 35 which engages the top edge 8 and a pointed tip or end 36 for ease of engagement into the ground.

In use, the pipes 2 are laid out in the manner desired and a plurality of anchor devices 1 are emplaced along the length of pipe 2 at appropriate intervals to prevent the pipe 2 from floating upwardly when concrete is poured. Preferably, a plurality of anchor devices 1 are provide in a carton with the spikes 34 separated from the bodies 5 for ease of packaging. The spikes 34 are simply inserted through the eye means 31 and the anchor device 1 pushed downwardly, driving the head 35 through the spike 34 downwardly with a hammer boot heel or appropriate force applying means. The anchor device 1 remains in place and is engulfed in the concrete as it is poured.

It is to be understood that while certain forms of the present invention have been illustrated and described herein, it is not to be limited to the specific forms or arrangement of parts described and shown.

What is claimed and desired to be secured by Letters Patent is as follows:

1. An anchor device for securing a circular pipe to the ground and comprising:
   (a) a body of flat, sheet stock material having opposite first and second ends and top and bottom edges, said bottom edge including means for grasping and retaining a pipe;
   (b) said bottom edge means including first, second and middle substantially straight edge segments formed to provide a concave recess for receipt of pipe of varying diameters, said first and second edge segments joining said middle segment at obtuse included angles of approximately two hundred degrees to two hundred and thirty degrees;
   (c) said body first end including eye means of stamped strips of sheet material;
   (d) a spike insertable through said eye means and having a pointed end for insertion into said ground; said spike being oriented substantially perpendicular to a longitudinal axis of said body;
   (e) said body second end having a sloping outer corner edge; and
   (f) said body having a rib extending substantially the length thereof and providing rigidity to said sheet stock material.

2. An anchor device for securing a circular pipe to the ground and comprising:
   (a) a body of flat, sheet stock material having opposite first and second ends and top and bottom edges, said bottom edge formed for grasping and retaining a pipe;
   (b) said bottom edge including first, second and middle substantially straight edge segments formed to provide a concave recess for receipt of pipe of varying diameters, said first and second edge segments joining said middle segment at obtuse included angles of approximately two hundred degrees to two hundred and thirty degrees;
   (c) said body first end including eye means of stamped strips of sheet material;
   (d) a spike insertable through said eye means and having a pointed end for insertion into said ground; said spike being oriented substantially perpendicular to a longitudinal axis of said body;
   (e) said body second end having a sloping outer corner edge; and
   (f) said body having a rib extending substantially the length thereof, deviating angularly and extending parallel to said outer corner edge, and providing rigidity to said sheet stock material.

* * * * *